United States Patent
Froment et al.

(10) Patent No.: US 12,052,376 B2
(45) Date of Patent: Jul. 30, 2024

(54) INTEGRATED PHYSICAL UNCLONABLE FUNCTION DEVICE

(71) Applicants: STMicroelectronics (Crolles 2) SAS, Crolles (FR); STMicroelectronics (Rousset) SAS, Rousset (FR)

(72) Inventors: Benoit Froment, Grenoble (FR); Jean-Marc Voisin, Chateauneuf-le-Rouge (FR)

(73) Assignees: STMicroelectronics (Crolles 2) SAS, Crolles (FR); STMicroelectronics (Rousset) SAS, Rousset (FR)

( * ) Notice: Subject to any disclaimer, the term of this patent is extended or adjusted under 35 U.S.C. 154(b) by 545 days.

(21) Appl. No.: 17/329,609

(22) Filed: May 25, 2021

(65) Prior Publication Data

US 2021/0377058 A1    Dec. 2, 2021

(30) Foreign Application Priority Data

May 28, 2020   (FR) ...................................... 2005653

(51) Int. Cl.
*H04L 9/32* (2006.01)
*H03K 19/003* (2006.01)
*H01L 23/64* (2006.01)

(52) U.S. Cl.
CPC ......... *H04L 9/3278* (2013.01); *H03K 19/003* (2013.01); *H01L 23/642* (2013.01)

(58) Field of Classification Search
CPC . H04L 9/3278; H04L 2209/12; H03K 19/003; H01L 23/642; H01L 23/576
See application file for complete search history.

(56) References Cited

U.S. PATENT DOCUMENTS

| | | | |
|---|---|---|---|
| 6,366,098 B1* | 4/2002 | Froment | G01R 27/2605 324/754.28 |
| 9,018,972 B1* | 4/2015 | Gurrieri | H03K 19/003 326/8 |

(Continued)

FOREIGN PATENT DOCUMENTS

| | | | | |
|---|---|---|---|---|
| CN | 109934021 A | * | 6/2019 | |
| CN | 110263588 A | * | 9/2019 | ............. G06F 21/73 |
| FR | 2780162 A1 | | 12/1999 | |

OTHER PUBLICATIONS

Q. Tang, W. H. Choi, L. Everson, K. K. Parhi and C. H. Kim, "A Physical Unclonable Function based on Capacitor Mismatch in a Charge-Redistribution SAR-ADC," 2018 IEEE International Symposium on Circuits and Systems (ISCAS), Florence, Italy, 2018, pp. 1-5 (Year: 2018).*

(Continued)

*Primary Examiner* — Farid Homayounmehr
*Assistant Examiner* — Zhimei Zhu
(74) *Attorney, Agent, or Firm* — Crowe & Dunlevy LLC (57) ABSTRACT

An integrated physical unclonable function device includes at least one reference capacitor and a number of comparison capacitors. A capacitance determination circuit operates to determine a capacitance of the at least one reference capacitor and a capacitance of each comparison capacitor. The determined capacitances of the comparison capacitors are then compared to the determined capacitance of the reference capacitor by a comparison circuit. A digital word is then generated with bit values indicative of a result of the comparisons made by the comparison circuit.

16 Claims, 3 Drawing Sheets

(56) References Cited

U.S. PATENT DOCUMENTS

| | | | |
|---|---|---|---|
| 10,560,079 B1* | 2/2020 | Das | G01R 27/2605 |
| 11,240,047 B2* | 2/2022 | Hurwitz | H04L 9/0869 |
| 2010/0090714 A1* | 4/2010 | Van Geloven | H01L 23/576 |
| | | | 324/705 |
| 2011/0068810 A1* | 3/2011 | Yeates | G06F 3/044 |
| | | | 324/676 |
| 2013/0233608 A1* | 9/2013 | Feng | H01L 21/76834 |
| | | | 174/266 |
| 2017/0102419 A1* | 4/2017 | Suwald | H01L 23/573 |
| 2019/0036690 A1 | 1/2019 | Choi et al. | |

OTHER PUBLICATIONS

INPI Search Report and Written Opinion for FR 2005653 dated Feb. 5, 2021 (12 pages).

* cited by examiner

INTEGRATED PHYSICAL UNCLONABLE FUNCTION DEVICE

PRIORITY CLAIM

This application claims the priority benefit of French Application for Patent No. 2005653, filed on May 28, 2020, the content of which is hereby incorporated by reference in its entirety to the maximum extent allowable by law.

TECHNICAL FIELD

Embodiments and implementations relate to integrated physical unclonable function (PUF) devices.

BACKGROUND

Integrated physical unclonable function (PUF) devices are used to authenticate integrated circuits and generate cryptographic keys. The integrated physical unclonable function devices are based on the variability of the intrinsic features of the integrated devices which can be obtained by the same manufacturing method. The variability of the intrinsic features can then be used to generate different binary words for each integrated physical unclonable function device.

There are several solutions for producing an integrated physical unclonable function device.

For example, a known solution uses several ring oscillator circuits (also known as "ring oscillators"). A ring oscillator circuit comprises odd-number of inverting logic gates connected in a closed loop. The ring oscillator circuit thus generates an oscillating signal.

In particular, each ring oscillator circuit comprises at least one capacitor having a first terminal connected between two inverting logic gates and a second terminal connected to ground. Each ring oscillator circuit further comprises, between each inverting logic gate, a resistor connected to the capacitor disposed between the inverting logic gates between which the resistor is placed. Each resistor is also connected to the inverting logic gates between which this resistor is placed.

The oscillation frequency of each ring oscillator circuit is then in particular defined by each resistor and by each capacitor of this ring oscillator circuit.

Due to the variability of the intrinsic features of such ring oscillator circuits, the oscillation frequency is different between the various ring oscillator circuits of the integrated device.

It is then possible to generate a digital word by comparing the frequency of some ring oscillator circuits, called comparison circuits, with a reference ring oscillator circuit, the result of each comparison used to generate a bit of the digital word. The digital word can then be used to generate keys.

For example, if the frequency of the comparison circuit is less than that of the reference circuit, then a '0' will be generated. Furthermore, if the frequency of the comparison circuit is greater than that of the reference circuit, then a '1' will be generated.

In such oscillator circuits, the capacitors have a capacitance much greater than an internal capacitance of each inverting gate.

However, such a significant capacitance can be measured by an ill-advised person such as a hacker.

After measuring the capacitance of each capacitor, this ill-advised person could duplicate each ring oscillator circuit and thus manufacture a new integrated device having the same intrinsic features as the initial integrated device on which the capacitance measurements by the ill-advised person were carried out.

This new integrated device could then be used maliciously to generate the same keys as the initial integrated device, so as to encrypt and/or decrypt confidential data.

Thus, these known solutions using ring oscillator circuits to produce an integrated physical unclonable function device are not robust.

Other known solutions for producing an integrated physical unclonable function device also have disadvantages, in particular in terms of robustness.

Therefore, there is a need in the art for provision of a robust integrated physical unclonable function device.

SUMMARY

According to one aspect, provision is made of an integrated physical unclonable function device comprising: at least one reference capacitor; a plurality of comparison capacitors; a capacitance determination circuit configured to determine capacitances of said at least one reference capacitor and of each comparison capacitor; a comparison circuit configured to compare the determined capacitance of each comparison capacitor with the capacitance of said at least one reference capacitor; and a generating circuit configured to generate a digital word from each comparison performed by the comparison circuit at an output of the integrated device.

The comparison of the capacitances of the comparison capacitors with the capacitance of said at least one reference capacitor enables the generation of a digital word, in particular a binary word, from the result of the comparison.

The digital word generated thus depends on the value of the capacitances of the comparison capacitors and of said at least one reference capacitor.

The value of the capacitances of the comparison capacitors and of said at least one reference capacitor is an intrinsic feature of the integrated device which can vary between two integrated physical unclonable function devices manufactured according to the same manufacturing method. Therefore, the results of the comparisons between the comparison capacitors and a reference capacitor of an integrated device may be different from the comparisons between the comparison capacitors and a reference capacitor of another integrated device. Thus, the digital words that can be generated may be different for each integrated device manufactured according to the same manufacturing method.

Furthermore, such an integrated device can be manufactured simply.

Preferably, each comparison capacitor has the same capacitive structure, called unitary capacitive structure. Furthermore, said at least one reference capacitor has a capacitive structure selected from said unitary capacitive structure and an assembly of a plurality of unitary capacitive structures.

In one embodiment, said unitary capacitive structure for each comparison capacitor and for said at least one reference capacitor has a capacitance less than 500 fF.

Preferably, said unitary capacitive structure for each comparison capacitor and for said at least one reference capacitor has a capacitance comprised between 0.1 fF and 200 fF.

The capacitance determination circuit is integrated into the integrated device and enables the determination of low capacitances of the order of those of the comparison capacitors and of said at least one reference capacitor.

Such a capacitance has the advantage that it cannot be easily measured from outside the integrated device.

Thus, it is made difficult for an ill-advised person such as hacker to measure the capacitances of the comparison capacitors and of said at least one reference capacitor in order to manufacture an integrated device having the same features as the proposed integrated device.

The proposed integrated device is therefore robust.

The integrated device may comprise a single reference capacitor or else several reference capacitors.

In particular, the integrated device can comprise as many reference capacitors as there are comparison capacitors. Each comparison capacitor can then be associated with a given reference capacitor from the set of reference capacitors. The comparison circuit can then be configured to compare the capacitance of each comparison capacitor with that of the reference capacitor which is associated with this comparison capacitor.

Furthermore, it is also possible to provide comparison capacitors which can also be used as reference capacitors. The capacitance of each comparison capacitor is then compared with that of a comparison capacitor used as a reference capacitor.

Using several comparison capacitors enables the generation of different binary words with the same integrated device.

Advantageously, the integrated device comprises a plurality of metallization levels separated by dielectric layers, each metallization level being provided with metal tracks. The capacitive structure of each capacitor among the comparison capacitors and said at least one reference capacitor then comprises two electrodes each formed of at least one metal track.

The capacitance of each capacitor then depends on the width of the tracks of its electrodes and on the distance between the tracks of the two electrodes of this capacitor.

In one advantageous embodiment, each electrode of each comparison capacitor is formed of a single metal track.

Nevertheless, it is also possible to provide comparison capacitors comprising electrodes each formed of several metal tracks. Nevertheless, it should be noted that generally the lower the capacitance of a capacitor, the greater the variability of the capacitor. For example, the shorter the metal tracks of the electrodes of a capacitor, the greater the variability of the capacitor can be. Indeed, the shorter the metal tracks of the electrodes of a capacitor, the more the value of its capacitance can fluctuate depending on its temperature and/or its ageing. However, it is important to use comparison capacitors with sufficient variability so that the integrated device can be used as a physical unclonable function.

In one advantageous embodiment, the capacitive structure of said at least one reference capacitor is said unitary capacitive structure.

The capacitance determination circuit is then configured to be able to determine the capacitance of said unitary capacitive structure of said at least one reference capacitor and of each comparison capacitor.

Furthermore, the comparison circuit is configured to compare the determined capacitance of the unitary capacitive structure of each comparison capacitor with the capacitance of the unitary capacitive structure of said at least one reference capacitor.

Furthermore, the generating circuit is configured to generate on an output of the integrated device a digital word from each comparison performed by the comparison circuit.

More particularly, when the capacitive structure of said at least one reference capacitor is a unitary capacitive structure, the electrodes of said at least one reference capacitor are formed by as many metal tracks as each comparison capacitor. For example, each electrode of each reference capacitor may be formed of a single metal track when each of the electrodes of each comparison capacitor is also formed of a single metal track. It is in particular advantageous for said at least one reference capacitor to have a structure at least substantially identical to that of each comparison capacitor.

The use of such a reference capacitor allows to simplify the manufacture of the integrated device and to compare capacitors having a similar structure.

Alternatively, in one embodiment, the capacitive structure of said at least one reference capacitor is an assembly of unitary capacitive structures.

The capacitance determination circuit is then configured to be able to determine an average capacitance of the unitary capacitive structures of said at least one reference capacitor and a capacitance of the unitary capacitive structure of each comparison capacitor.

Furthermore, the comparison circuit is configured to compare the determined capacitance of the unitary capacitive structure of each comparison capacitor with the average capacitance of the unitary capacitive structures of said at least one reference capacitor.

The generating circuit is configured to generate a digital word from each comparison performed by the comparison circuit at an output of the integrated device.

In particular, when the capacitive structure of said at least one reference capacitor is an assembly of unitary capacitive structures, the reference capacitor comprises a first electrode formed of at least one metal track and a second electrode formed of at least two metal tracks.

For example, preferably, said at least one reference capacitor may comprise electrodes formed of several metal tracks arranged so that this capacitor has a structure corresponding to several unitary capacitive structures of comparison capacitors mounted in parallel.

In particular, the greater the number of unitary capacitive structures of said at least one reference capacitor, the lower the variability of the average capacitance of this reference capacitor.

Thus, preferably, each reference capacitor has an average capacitance of lower variability than that of the comparison capacitors.

The total capacitance of the reference capacitor then corresponds to the sum of the unitary local capacitances between the metal tracks of each unitary capacitive structure of the electrodes of this reference capacitor. This total capacitance of the reference capacitor can be obtained using the capacitance determination circuit. The total capacitance can then be divided by the number of local capacitances so as to obtain an average unit capacitance, in particular using a dedicated electronic circuit. This average unit capacitance has a low variability, as indicated above. The capacitance of the comparison capacitors can then be compared with this average unit capacitance of the reference capacitor.

It is then simpler to compare the capacitance of the comparison capacitors with that of said at least one reference capacitor.

Indeed, when comparing the capacitance of the comparison capacitors with said at least one reference capacitor, a margin can be applied relative to the average unit capacitance of the reference capacitor.

The capacitance of each comparison capacitor can then be compared with the average unit capacitance of the reference capacitor taking this margin into consideration.

Comparison capacitors having a capacitance comprised within this margin may not be taken into consideration to form the binary word. Indeed, it may be advantageous not to take into consideration the comparison capacitors having a capacitance too close to the average unit capacitance because their capacitance can fluctuate so that it is greater, at times, than the average unit capacitance of the reference capacitor and, at other times, less than this average unit capacitance. Preferably, the margin is defined between 5% and 20% of the average unit capacitance of the reference capacitor.

Thus, in order to be able to generate a binary word having a given number of bits, it may be advantageous to provide a number of comparison capacitors greater than the number of bits of the binary word to be generated to compensate for any comparison rejections.

In one advantageous embodiment, the capacitance determination circuit comprises a single current measuring circuit configured to measure the current between a power supply terminal and a ground terminal, and, for each capacitor among the comparison capacitors and said at least one reference capacitor, at least two branches, the first branch comprising a first switch disposed between the current measuring circuit and an electrode of the capacitor, and a second switch disposed between this same electrode and the ground terminal, the second branch being identical to the first one and connected to the other electrode of the capacitor for a measurement of the capacitance between these two electrodes.

According to another aspect, provision is made of a digital word generation method using an integrated physical unclonable function device comprising: at least one reference capacitor and a plurality of comparison capacitors, wherein the method comprises: powering-up of the integrated physical unclonable function device; determining capacitances of said at least one reference capacitor and of each comparison capacitor; comparing the determined capacitance of each comparison capacitor and the capacitance of said at least one reference capacitor; and generating a digital word from a result of said comparisons.

In one advantageous implementation, each comparison capacitor has the same capacitive structure, called unitary capacitive structure. Furthermore, said at least one reference capacitor has a capacitive structure selected from said unitary capacitive structure and an assembly of a plurality of unitary capacitive structures.

In one advantageous implementation, the integrated device comprises a plurality of metallization levels separated by dielectric layers, the capacitive structure of each metallization level being provided with metal tracks, each capacitor among the comparison capacitors and said at least one reference capacitor comprising two electrodes each formed of at least one metal track.

In one advantageous implementation, each electrode of each comparison capacitor is formed of a single metal track.

In one advantageous implementation, the capacitive structure of said at least one reference capacitor is said unitary capacitive structure. The method then comprises: determining capacitances of said unitary capacitive structure of said at least one reference capacitor and of each comparison capacitor; comparing the determined capacitance of the unitary capacitive structure of each comparison capacitor and the capacitance of the unitary capacitive structure of said at least one reference capacitor; and generating a digital word from a result of said comparisons performed by the comparison circuit.

Alternatively, in another advantageous implementation, the capacitive structure of said at least one reference capacitor is an assembly of unitary capacitive structures, and the method comprises: determining an average capacitance of the unitary capacitive structures of said at least one reference capacitor; determining a capacitance of the unitary capacitive structure of each comparison capacitor; comparing the determined capacitance of the unitary capacitive structure of each comparison capacitor and the average capacitance of the unitary capacitive structures of said at least one reference capacitor; and generating a digital word from a result of said comparisons performed by the comparison circuit.

In one advantageous implementation, said unitary capacitive structure for each comparison capacitor and for said at least one reference capacitor has a capacitance less than 500 fF.

Preferably, said unitary capacitive structure for each comparison capacitor and for said at least one reference capacitor has a capacitance comprised between 0.1 fF and 200 fF.

In one advantageous implementation, the measurement of the capacitances of the capacitors is carried out by a capacitance determination circuit comprising a current measuring circuit configured to measure the current between a power supply terminal and a ground terminal, and, for each capacitor among the comparison capacitors and said at least one reference capacitor, at least two branches, the first branch comprising a first switch disposed between the current measuring circuit and an electrode of the capacitor, and a second switch disposed between this same electrode and the ground terminal, the second branch being identical to the first one and connected to the other electrode of the capacitor for a measurement of the capacitance between these two electrodes.

BRIEF DESCRIPTION OF THE DRAWINGS

Other advantages and features will become apparent upon examining the detailed description of implementations and embodiments, which are in no way limiting, and the appended drawings wherein.

DETAILED DESCRIPTION

Figure 1:
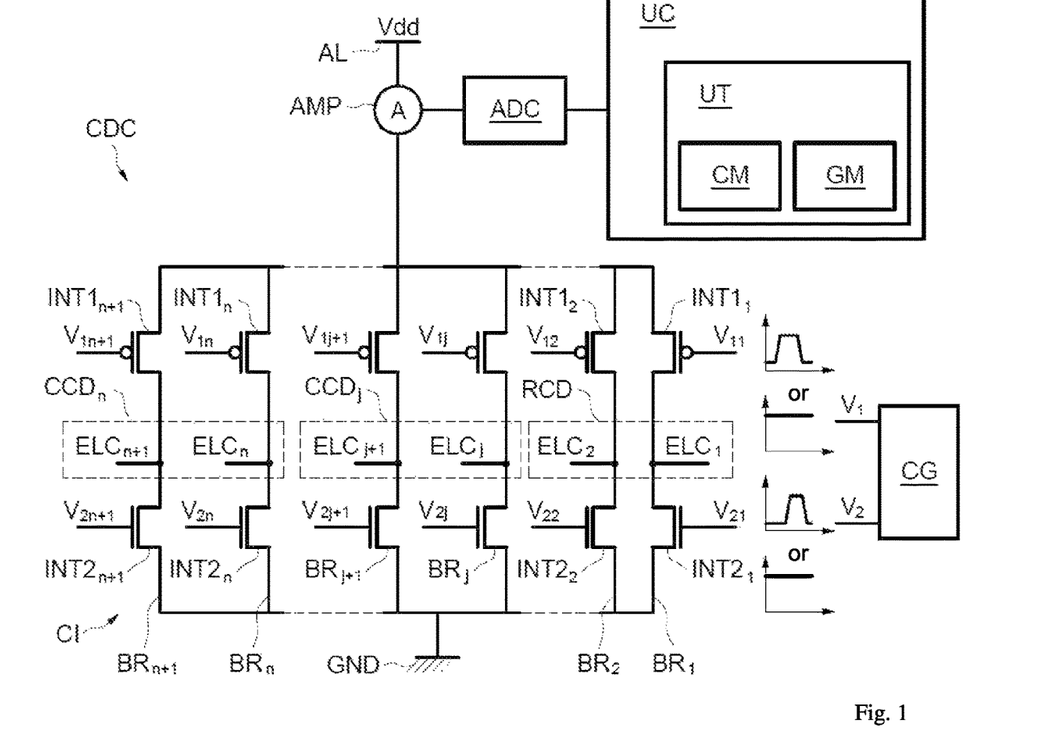
FIG. 1 illustrates an integrated unclonable physical function device.

FIG. 1 illustrates an integrated unclonable physical function device IC according to one embodiment. Such an integrated device CI is configured to generate digital words.

The integrated device CI comprises a plurality of metallization levels separated by dielectric layers. Each metallization level is provided with metal tracks.

Some metal tracks are separated by a dielectric material allow to form capacitors RCD, CCD within the integrated device.

In particular, preferably, the dielectric used between the metal tracks of the capacitors RCD, CCD is a material with a low dielectric constant ("low-k" dielectric). The dielectric may in particular be a material having a dielectric constant less than or equal to that of $SiO_2$. For example, the dielectric is a material selected from the following materials: $SiO_2$, $Si_3N_4$, $SiO_xH_y$, $SiO_xF_y$, $SiO_xC_y$.

These capacitors RCD and CCD each have a capacitive structure. The capacitive structure of each capacitor RCD, CCD comprises two electrodes ELC formed by some of the metal tracks of the integrated device CI.

In particular, the integrated device CI comprises in particular at least one reference capacitor RCD and a plurality of comparison capacitors CCD.

As will be detailed in more detail below, the integrated device CI is configured to compare the comparison capacitors CCD to said at least one reference capacitor RCD.

In particular, the integrated device may comprise a single reference capacitor RCD or else several reference capacitors RCD with which the comparison capacitors CCD will be compared.

In particular, the integrated device may comprise as many reference capacitors RCD as there are comparison capacitors CCD. Each comparison capacitor CCD can then be associated with a given reference capacitor among the set of reference capacitors RCD. It is then possible to compare the capacitance of each comparison capacitor with that of the reference capacitor which is associated with this comparison capacitor.

Alternatively, it is also possible to provide comparison capacitors CCD which can also be used as reference capacitors RCD. The capacitance of each comparison capacitor is then compared with that of a comparison capacitor CCD used as the reference capacitor RCD.

In the embodiment shown in FIG. 1, just for example purposes, the integrated device CI comprises a single reference capacitor RCD comprising a first electrode ELC1 and a second electrode ELC2.

Each comparison capacitor CCD has the same capacitive structure, called unitary capacitive structure.

Said at least one reference capacitor RCD has a capacitive structure selected from said unitary capacitive structure and an assembly of a plurality of unitary capacitive structures.

The unitary capacitive structures of the comparison capacitors and those forming said at least one reference capacitor RCD are substantially identical and manufactured according to the same manufacturing method. Furthermore, the capacitance of these unitary capacitive structures is defined in particular by the distance between its metal tracks as well as the width of these metal tracks and their facing surface.

However, although the unitary capacitive structures are formed by the same manufacturing method, the distance between the metal tracks of a capacitive structure as well as their width and their facing surface may vary slightly from one unitary capacitive structure to another. As a result, the unitary capacitive structures may have capacitances which are different from one another.

Preferably, the unitary capacitive structure for each comparison capacitor CCD and for said at least one reference capacitor RCD has a capacitance less than 500 fF, in particular comprised between 0.1 fF and 200 fF.

FIGS. 2 to 5 show different possible unitary capacitive structures. These unitary capacitive structures comprise two electrodes each formed of a single metal track. These unitary structures therefore comprise two metal tracks.

Figure 2:
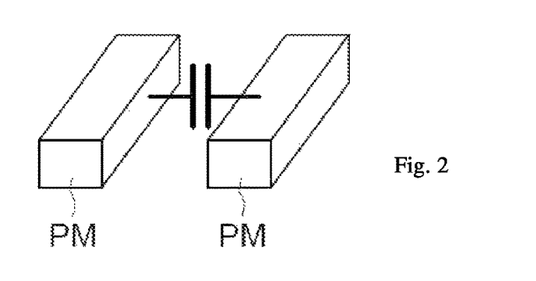
FIGS. 2 to 6 show different possible unitary capacitive structures.

For example, the two metal tracks PM of a unitary capacitive structure can extend parallel to each other. In particular, these two metal tracks can be located on the same metallization level in the integrated device, as shown in FIG. 2, or else at different metallization levels, as shown in FIGS. 3 to 5.

Figure 3:
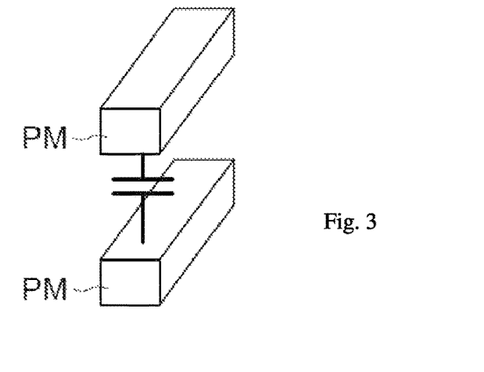
Figure 4:
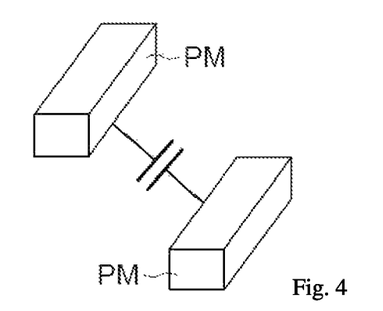
Figure 5:
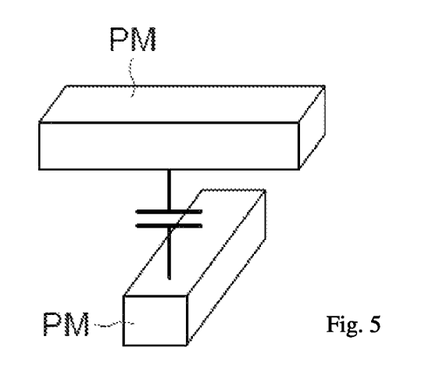

When the metal tracks PM are located on two different metallization levels, the metal tracks can be disposed facing one another along a vertical axis, as shown in FIG. 3 or else offset relative to each other, as shown in FIG. 4.

Alternatively, the unitary capacitive structure may comprise two metal tracks PM which may be non-parallel, in particular orthogonal, relative to each other. The two metal tracks are then located on two different metallization levels of the integrated device. An example of metal tracks orthogonal to each other is shown in FIG. 5.

It is nevertheless possible to provide unitary capacitive structures comprising at least one electrode formed of several metal tracks.

Figure 6:
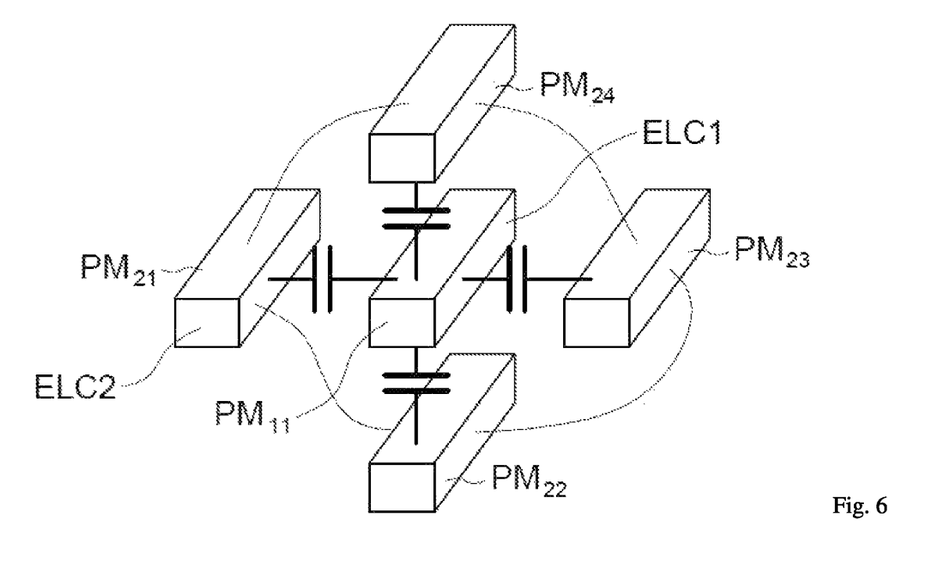

For example, a unitary capacitive structure can comprise a first electrode ELC1 formed of a single metal track $PM_{11}$ and a second electrode ELC2 formed of four electrically connected metal tracks $PM_{21}$, $PM_{22}$, $PM_{23}$, $PM_{24}$ disposed around the metal track of the first electrode, as shown in FIG. 6. The metal tracks of the second electrode ELC2 are therefore here disposed on three different metallization levels and parallel to the metal track of the first electrode.

Nevertheless, it should be noted that the smaller the number of metal tracks on each electrode of a capacitor, the greater the variability of the capacitor.

However, it is important to use comparison capacitors CCD with sufficient variability so that the integrated device can be used as an unclonable physical function. Thus, it may be preferable to provide a unitary capacitive structure having two electrodes each formed of a single metal track.

As seen above, the capacitive structure of said at least one reference capacitor RCD is formed of a single unitary capacitive structure or else an assembly of several unitary structures.

When the capacitive structure of said at least one reference capacitor is formed of an assembly of several unitary structures, said at least one reference capacitor comprises a first electrode comprising at least one metal track and a second electrode comprising several metal tracks.

Thus, said at least one reference capacitor has a total capacitance equal to the sum of the capacitances of each unitary capacitive structure of this reference capacitor.

Figure 7:
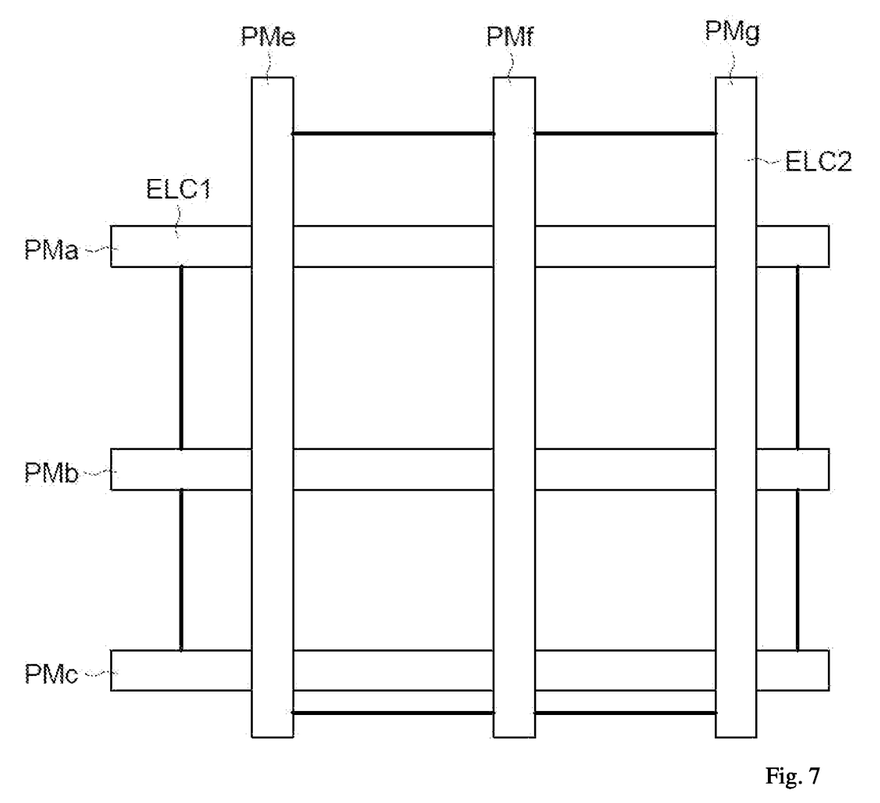
FIG. 7 shows a reference capacitive structure.

For example, the reference capacitor RCD shown in FIG. 7 comprises a first electrode $ELC_1$ formed of three electrically connected metal tracks $PM_a$, $PM_b$, $PM_c$ and a second electrode $ELC_2$ formed of three electrically connected tracks $PM_d$, $PM_e$, $PM_f$. The three metal tracks of the same electrode are parallel to each other and located at the same metallization level. Furthermore, the metal tracks of one electrode are orthogonal to the metal tracks of the other electrode.

The fact of using a reference capacitor formed of an assembly of unitary capacitive structures enables a reduction in variability of the value of an average capacitance of the unitary capacitive structures of this reference capacitor.

The integrated device shown in FIG. 1 also comprises a plurality of comparison capacitors CCD, including a comparison capacitor $ELC_j$ comprising the electrodes $ELC_j$ and $ELC_{j+1}$, and the comparison capacitor $ELC_n$ comprising the electrodes $ELC_n$ and $ELC_{n+1}$.

The integrated device further comprises a capacitance determination circuit CDC. This capacitance determination circuit CDC is configured to be able to determine the capacitance of each capacitor CCD and RCD.

In particular, the determination circuit CDC comprises a single current measuring circuit AMP that is configured to measure the current between a power supply terminal AL capable of providing a voltage Vdd and a ground terminal GND of the integrated device. The current measuring circuit AMP is therefore incorporated into the integrated device DI.

The current measuring circuit AMP can, for example, be a current integrator such as a charge amplifier. Such a charge amplifier is well known to the person skilled in the art.

Furthermore, for each capacitor CCD and RCD, the capacitance determination circuit CDC comprises two branches BR, in particular one branch BR for each electrode of the capacitor. The branches BR are configured similarly.

In particular, each branch BR comprises a first switch INT1 disposed between the current measuring circuit AMP and an electrode of the capacitor, and a second switch INT2 disposed between this same electrode and the ground terminal GND.

The first switch INT1 is a PMOS transistor and the second switch INT2 is an NMOS transistor. These two transistors are therefore disposed in series and their common point (drain) is connected to said electrode of the capacitor.

A clock generator CG is configured to generate two clock signals V1 and V2. The clock signal V1 temporally overlaps the clock signal V2 partially. These two clock signals are emitted at the same frequency defined by the clock generator CG.

A control unit UC is configured to use these clock signals V1 and V2 to control the switches INT1, INT2 of the integrated device using signals that can be generated by the clock generator. In particular, these signals are used to control the gates of the PMOS and NMOS transistors (see the signals $V_{11}$ to $V_{1n+1}$ from the signal $V_1$, and the signals $V_{21}$ to $V_{2n+1}$ from the signal $V_2$).

The control unit UC can be implemented by a microcontroller for example.

In particular, the control unit UC is configured to control the various switches INT1, INT2 in the manner described by U.S. Pat. No. 6,366,098 (incorporated herein by reference) for an application completely different from that of unclonable logic functions. Reference may also be made to the publication "Ultra Low capacitance measurements in multilevel CMOS metallization by using a built-in Electronmeter", by B. Froment, et al., published in 1999 in the International Electron Devices Meeting, Technical Digest.

In particular, the control unit UC is configured to determine the capacitance between two electrodes of a capacitor CCD, RCD from several current measurements by the current measuring circuit AMP. The current measurements are carried out for different states of the switches INT1, INT2 of the branches of the capacitance determination circuit connected to these two electrodes.

In particular, a current I1 is measured by controlling the first switch of the first branch and the second switch of the second branch in an on-state, and by controlling the second switch of the first branch and the first switch of the second branch in an off-state.

Furthermore, a current I2 is measured by controlling the first switch of the first branch and the second switch of the second branch in an off-state state, and by controlling the second switch of the first branch and the first switch of the second branch in an off-state state.

A current I3 is measured by controlling the first switch of the first branch and the first switch of the second branch in an on-state, and by controlling the second switch of the first branch and the second switch of the second branch in an off-state state.

The capacitance determination circuit CDC also comprises an analog-to-digital converter ADC configured to convert the value of the measured currents into a digital value.

The capacitance determination circuit CDC also comprises a processing unit UT configured to determine a capacitance between two electrodes of a capacitor from the digital values of the measured currents.

In particular, the processing unit UT is configured to determine the capacitance between the two electrodes of a capacitor by the formula:

$$C_{ij} = \frac{I1 + I2 - I3}{2 \times F \times Vdd}$$

where F is the frequency of the signal provided by the frequency generator and Vdd is the voltage at the power supply terminal.

The average capacitance of the reference capacitor RCD is obtained by firstly measuring a total capacitance between the electrodes of the reference capacitor. This total capacitance is equal to the sum of the capacitances of the unitary capacitive structures of the reference capacitor. Thus, when the reference capacitor comprises a single unitary capacitive structure, its total capacitance is equal to the capacitance of this unitary capacitive structure.

The processing unit is then configured to be able to divide this total capacitance by the number of unitary capacitive structures of this reference capacitor so as to be able to obtain an average capacitance from which the capacitance of the unitary capacitive structure of each comparison capacitor will be able to be compared.

In particular, the processing unit is configured to apply a margin relative to the average unit capacitance of the reference capacitor. The capacitances of the comparison capacitors can then be compared with the average unit capacitance of the reference capacitor by taking this margin into consideration.

More particularly, the processing unit can be configured so as to not take into account the comparison capacitors having a capacitance comprised within this margin to form the binary word.

Indeed, it may be advantageous not to take into consideration the comparison capacitors having a capacitance too close to the average unit capacitance because their capacitance can fluctuate so that it is greater, at times, than the average unit capacitance of the reference capacitor and, at other times, less than this average unit capacitance.

Preferably, the margin is defined between 5% and 20% of the average unit capacitance of the reference capacitor.

The processing unit UT can be a processor of the control unit UC or else a dedicated logic circuit comprising in particular at least one adder.

The integrated device further comprises a comparison circuit CM. The comparison circuit CM is configured to compare the determined capacitance of each comparison capacitor CCD with the capacitance of a reference capacitor RCD.

In particular, the comparison circuit CM is configured to determine, for each comparison capacitor CCD, whether the capacitance of this comparison capacitor CCD is less than or greater than the capacitance of a reference capacitor RCD.

The comparison circuit CM can be implemented by the processing unit UT.

The integrated device CI also comprises a digital circuit GM configured to generate a digital word. The digital circuit GM is configured to generate a digital word, in particular a binary word, from each comparison performed by the comparison circuit CM.

The digital word that can be generated by the digital circuit GM comprises a plurality of bits.

In particular, the digital circuit GM is configured to assign a value to each bit depending on the results of the comparisons that can be carried out by the comparison circuit CM.

Thus, each bit of the digital word is associated with a given comparison capacitor CCD, the value of this bit depending on the result of the comparison between the value of the capacitance of this comparison capacitor CCD and the reference capacitor RCD.

For example, the generating circuit is configured to assign a value '0' to a bit when the result of the comparison of the comparison capacitor CCD associated with this bit and the reference capacitor RCD indicates that the value of the capacitance of the comparison capacitor CCD used for this comparison is less than the value of the capacitance of the reference capacitor RCD used for this comparison, in particular also taking said margin into consideration. The generating circuit is then also configured to assign a value '1' to this bit when the result of said comparison indicates that the value of the capacitance of this comparison capacitor CCD is greater than the value of the capacitance of this reference capacitor RCD, in particular also taking said margin into consideration.

The binary words that can thus be generated can then be used to develop encryption keys, for example.

For example, an integrated device comprising at least 128 comparison capacitors CCD can be used in order to obtain a 128-bit digital word.

The integrated device CI can be used as a physical unclonable function. Indeed, the value of the capacitances of the comparison capacitors and of said at least one reference capacitor is an intrinsic feature of the circuit which can greatly vary between two integrated devices CI manufactured according to the same manufacturing method.

Furthermore, the low capacitances cannot be easily measured from outside the integrated device.

Thus, it is made difficult for an ill-advised person to measure the capacitances of the comparison capacitors and of said at least one reference capacitor in order to manufacture an integrated device having the same features as the proposed integrated device.

Thus, the proposed integrated device is robust.

Further, such an integrated device can be manufactured simply.

Figure 8:
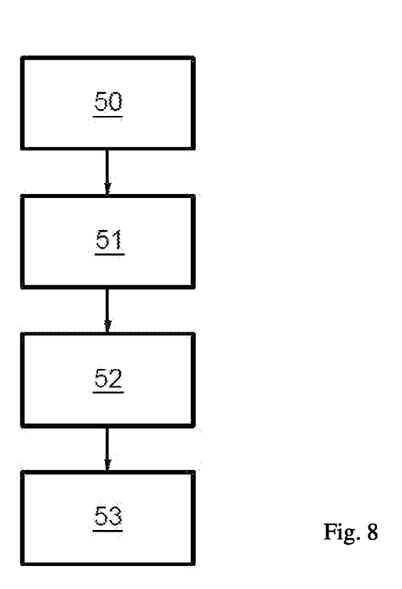
FIG. 8 illustrates a digital word generation method.

FIG. 8 illustrates a digital word generation method according to one embodiment of the invention, which can be implemented by the integrated device CI described above.

The digital word generation method comprises a powering-up step 50 wherein the comparison capacitors CCD and the reference capacitor RCD are charged.

The digital word generation method then comprises a step 51 of determining the capacitance. In this step 51, the capacitances of the comparison capacitors CCD and of the reference capacitor RCD are determined by the capacitance determination circuit.

In particular, in this step 51, the control unit UC controls the switches of the capacitance determination circuit by using the signals generated by the frequency generator CG so as to measure the currents I1, I2 and I3 using the current measuring circuit AMP for each capacitor between the metal lines of each capacitor CCD and RCD.

The analogue-to-digital converter ADC then converts the values of the currents I1, I2 and I3 into digital values.

These digital values are then transmitted to the processing unit UT which calculates the capacitances of the comparison capacitors CCD and the average unit capacitance of the reference capacitor RCD using the formula noted above.

Then, the digital word generation method comprises a comparison step 52 wherein the comparison circuit CM compare the values of the capacitances of the comparison capacitors CCD with the value of the average unit capacitance of said at least one reference capacitor RCD.

Then, the digital word generation method comprises a step 53 of generating a digital word wherein the digital circuit GM generates a digital word from the results of the comparisons carried out in step 52. In particular, as seen previously, the digital circuit GM assigns a value to each bit of the digital word. This value depends on the result obtained from the comparison between the capacitance of the comparison capacitor CCD associated with this bit and the reference capacitor RCD.

The generated digital word can then be used to generate encryption keys as indicated previously.

The invention claimed is:

1. An integrated physical unclonable function device, comprising:
    at least one reference capacitor;
    a plurality of comparison capacitors;
    wherein each comparison capacitor has a same unitary capacitive structure, and wherein said at least one reference capacitor has a capacitive structure selected from said unitary capacitive structure and an assembly of a plurality of unitary capacitive structures;
    a capacitance determination circuit configured to determine capacitances of said at least one reference capacitor and of each comparison capacitor;
    a comparison circuit configured to compare the determined capacitance of each comparison capacitor with the determined capacitance of said at least one reference capacitor; and
    a generating circuit configured to generate a digital word indicative of a result of the comparisons performed by the comparison circuit.

2. The device according to claim 1, further comprising a plurality of metallization levels separated by dielectric layers, each metallization level including metal tracks, wherein the capacitive structure of each capacitor forming the comparison capacitors and said at least one reference capacitor comprises two electrodes each formed of at least one metal track.

3. The device according to claim 2, wherein each electrode of each comparison capacitor is formed of a single metal track.

4. The device according to claim 1, wherein the capacitive structure of said at least one reference capacitor is said unitary capacitive structure, and wherein:
    the capacitance determination circuit is configured to determine a capacitance of said unitary capacitive structure of said at least one reference capacitor and determine a capacitance of each comparison capacitor; and
    the comparison circuit is configured to compare the determined capacitance of the unitary capacitive structure of each comparison capacitor with the determined capacitance of the unitary capacitive structure of said at least one reference capacitor.

5. The device according to claim 1, wherein the capacitive structure of said at least one reference capacitor is said assembly of the plurality of unitary capacitive structures, and wherein:
    the capacitance determination circuit is configured to determine an average capacitance of the unitary capacitive structures of said at least one reference capacitor and determine a capacitance of the unitary capacitive structure of each comparison capacitor; and the comparison circuit is configured to compare the determined capacitance of the unitary capacitive structure of each comparison capacitor with the determined average capacitance of the unitary capacitive structures of said at least one reference capacitor.

6. The device according to claim 1, wherein said unitary capacitive structure for each comparison capacitor and for said at least one reference capacitor has a capacitance less than 500 fF.

7. The device according to claim 1, wherein said unitary capacitive structure for each comparison capacitor and for said at least one reference capacitor has a capacitance comprised between 0.1 fF and 200 fF.

8. The device according to claim 1, wherein the capacitance determination circuit comprises:

a current measuring circuit configured to measure a current flow between a power supply terminal and a ground terminal; and wherein each capacitor among the comparison capacitors and said at least one reference capacitor comprises two branches, a first branch comprising a first switch disposed between the current measuring circuit and a first electrode of the capacitor and a second switch disposed between said first electrode and the ground terminal, and a second branch comprising a third switch disposed between the current measuring circuit and a second electrode of the capacitor and a fourth switch disposed between said second electrode and the ground terminal;

wherein the capacitance determination circuit measures capacitance between the first and second electrodes.

9. A digital word generation method using an integrated physical unclonable function device which includes at least one reference capacitor and a plurality of comparison capacitors, wherein each comparison capacitor has a unitary capacitive structure, and wherein said at least one reference capacitor has a capacitive structure selected from said unitary capacitive structure and an assembly of a plurality of unitary capacitive structures, the method comprising:

powering-up of the integrated physical unclonable function device;

determining capacitances of said at least one reference capacitor and of each comparison capacitor;

comparing the determined capacitance of each comparison capacitor and the determined capacitance of said at least one reference capacitor; and generating a digital word in response to a result of said comparing.

10. The method according to claim 9, wherein the integrated physical unclonable function device comprises a plurality of metallization levels separated by dielectric layers, each metallization level including metal tracks, wherein the capacitive structure of each capacitor forming the comparison capacitors and said at least one reference capacitor comprises two electrodes each formed of at least one metal track.

11. The method according to claim 10, wherein each electrode of each comparison capacitor is formed of a single metal track.

12. The method according to claim 9, wherein the capacitive structure of said at least one reference capacitor is said unitary capacitive structure, and wherein:

determining comprises determining a capacitance of said unitary capacitive structure of said at least one reference capacitor and determining a capacitance of each comparison capacitor; and comparing comprises comparing the determined capacitance of the unitary capacitive structure of each comparison capacitor and the determined capacitance of the unitary capacitive structure of said at least one reference capacitor.

13. The method according to claim 9, wherein the capacitive structure of said at least one reference capacitor is said assembly of the plurality of unitary capacitive structures, and wherein:

determining comprises determining an average capacitance of the unitary capacitive structures of said at least one reference capacitor and determining a capacitance of the unitary capacitive structure of each comparison capacitor; and comparing comprises comparing the determined capacitance of the unitary capacitive structure of each comparison capacitor and determined average capacitance of the unitary capacitive structures of said at least one reference capacitor.

14. The method according to claim 9, wherein said unitary capacitive structure for each comparison capacitor and for said at least one reference capacitor has a capacitance less than 500 fF.

15. The method according to claim 9, wherein said unitary capacitive structure for each comparison capacitor and for said at least one reference capacitor has a capacitance comprised between 0.1 fF and 200 fF.

16. The method according to claim 9, wherein a circuit comprises, for each capacitor among the comparison capacitors and said at least one reference capacitor, a first branch including a first switch coupled between a power supply terminal and a first electrode of the capacitor and a second switch coupled between the first electrode and a ground terminal, and a second branch including a third switch coupled between the power supply terminal and a second electrode of the capacitor and a fourth switch coupled between the second electrode and the ground terminal, and wherein measuring capacitances comprises:

selectively controlling switching of the first, second, third and fourth switches;

measuring current flow between the power supply terminal and the ground terminal in response to said selectively controlled switching; and determining capacitance as a function of the measured current flow.

* * * * *